United States Patent
Evans et al.

(10) Patent No.: US 8,914,665 B2
(45) Date of Patent: *Dec. 16, 2014

(54) READING OR STORING BOOT DATA IN AUXILIARY MEMORY OF A TAPE CARTRIDGE

(75) Inventors: Rhys Wyn Evans, Bristol (GB); Alastair Michael Slater, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1308 days.

This patent is subject to a terminal disclaimer.

(21) Appl. No.: 11/480,917

(22) Filed: Jul. 6, 2006

(65) Prior Publication Data

US 2007/0101113 A1 May 3, 2007

(30) Foreign Application Priority Data

Oct. 31, 2005 (GB) .................................. 0522221.1

(51) Int. Cl.
*G06F 11/00* (2006.01)
*G06F 9/44* (2006.01)
*G06F 11/14* (2006.01)

(52) U.S. Cl.
CPC .......... *G06F 9/4406* (2013.01); *G06F 11/1417* (2013.01); *G06F 11/1469* (2013.01); *G06F 11/1456* (2013.01)
USPC .............................................. 714/6.1; 714/42

(58) Field of Classification Search
USPC ................................. 714/6, 6.1, 42
See application file for complete search history.

(56) References Cited

U.S. PATENT DOCUMENTS

| | | | |
|---|---|---|---|
| 5,269,022 A | 12/1993 | Shinjo | |
| 5,469,573 A * | 11/1995 | McGill et al. | ................. 717/127 |
| 5,727,213 A | 3/1998 | Vander Kamp | |
| 5,812,748 A | 9/1998 | Ohran | |
| 5,907,672 A | 5/1999 | Matze | |
| 5,930,824 A | 7/1999 | Anglin | |
| 6,029,232 A | 2/2000 | Honda | |
| 6,088,815 A | 7/2000 | West | |
| 6,134,673 A | 10/2000 | Chrabaszcz | |
| 6,154,852 A * | 11/2000 | Amundson et al. | ............... 714/5 |
| 6,177,860 B1 * | 1/2001 | Cromer et al. | ............... 340/10.1 |
| 6,256,773 B1 | 7/2001 | Bowman-Amuah | |
| 6,263,454 B1 | 7/2001 | Gold | |

(Continued)

FOREIGN PATENT DOCUMENTS

| | | |
|---|---|---|
| EP | 0597654 | 5/1994 |
| EP | 1 174795 A1 | 1/2002 |

(Continued)

OTHER PUBLICATIONS

U.S. Appl. No. 10/965,200, Notice of Allowance dated May 21, 2007, pp. 1-6.

(Continued)

*Primary Examiner* — Loan L. T. Truong
(74) *Attorney, Agent, or Firm* — Hewlett-Packard Patent Department

(57) ABSTRACT

A tape drive for exchanging data with a tape cartridge, which has tape media and auxiliary memory that is not tape media, is operable, in response to a boot request from a computer apparatus that is bootable from a kind of initial program load device that is not a tape drive, to read boot data stored on the auxiliary memory and to output the boot data for booting the computer apparatus.

9 Claims, 6 Drawing Sheets

(56) References Cited

U.S. PATENT DOCUMENTS

| | | |
|---|---|---|
| 6,282,641 B1 * | 8/2001 | Christensen ............... 713/2 |
| 6,374,318 B1 * | 4/2002 | Hayes et al. ............... 710/107 |
| 6,701,450 B1 * | 3/2004 | Gold et al. ............... 714/5 |
| 6,744,595 B2 | 6/2004 | Blair |
| 6,942,158 B2 | 9/2005 | Waters |
| 7,089,449 B1 * | 8/2006 | Cluff et al. ............... 714/15 |
| 7,415,570 B2 * | 8/2008 | Evans et al. ............... 711/111 |
| 2002/0163760 A1 * | 11/2002 | Lindsey et al. ............... 360/134 |
| 2002/0194528 A1 | 12/2002 | Hart |
| 2004/0100382 A1 | 5/2004 | Waters |
| 2005/0114387 A1 * | 5/2005 | Evans et al. ............... 707/102 |
| 2005/0120166 A1 * | 6/2005 | Evans et al. ............... 711/111 |
| 2005/0133583 A1 * | 6/2005 | Tada ............... 235/375 |
| 2005/0152670 A1 * | 7/2005 | Skaar ............... 386/46 |
| 2005/0166010 A1 * | 7/2005 | Martin ............... 711/111 |
| 2006/0163407 A1 * | 7/2006 | Stamm et al. ............... 242/348 |
| 2006/0171055 A1 * | 8/2006 | Ballard ............... 360/69 |
| 2007/0136517 A1 * | 6/2007 | Edling ............... 711/111 |

FOREIGN PATENT DOCUMENTS

| | | |
|---|---|---|
| EP | 1528470 A1 | 5/2005 |
| GB | 2409328 A | 6/2005 |
| WO | 0008561 | 2/2000 |

OTHER PUBLICATIONS

U.S. Appl. No. 10/965,200, Non-Final Rejection dated Jan. 25, 2007, pp. 1-9 and attachments.

U.S. Appl. No. 09/850,441, Examiner's Answer dated Mar. 14, 2008, pp. 1-13.

U.S. Appl. No. 09/850,441, Final Rejection dated Jul. 2, 2007, pp. 1-9 and attachments.

U.S. Appl. No. 09/850,441, Non-Final Rejection dated Feb. 9, 2005, pp. 1-6 and attachments.

Curtis E. Stevens et al., "El Torito Bootable CD-ROM Format Specification," Version 1.0, Jan. 25, 1995, (20 pages).

GB Appl. No. 0522221.1 Search Report dated Feb. 27, 2006 (3 pages).

GB Intellectual Property Office, GB Application No. 0522221.1, Examination Report dated Jun. 23, 2010 (3 pages).

* cited by examiner

US 8,914,665 B2

READING OR STORING BOOT DATA IN AUXILIARY MEMORY OF A TAPE CARTRIDGE

RELATED APPLICATION

This application is related and claims priority to co pending United Kingdom utility application entitled "Data back-up and recovery", having serial no. GB 0522221.1, filed 31 Oct. 2005 which is entirely incorporated herein by reference.

TECHNICAL FIELD

The present invention relates to the field of data back-up and recovery.

BACKGROUND

It is known to back-up data stored on primary storage, such as a hard disk, of a computer system in order to protect against a disaster that might otherwise irrecoverably destroy all or part of the data. Disasters for example may be fire, flood, computer virus or simply accidental deletion of data. One of the main reasons for using magnetic tape as the back-up storage medium is that it provides a stable, reliable and relatively cheap option for storing large volumes of backed-up data.

Back-up application software which executes on the computer system typically provides the functions for enabling such computer system data to be both backed-up to, and restored from, tape media, which is written to and read from a tape drive. Well-known back-up application software includes 'Replica™' from Stac, 'ArcServe™' from Computer Associates, 'Back-upExec™' from Veritas and 'Omniback™' from HP. Well-known tape drives include DDS™ and LTO™ compliant tape drives, both available from HP.

In the event of a disaster, such as hard disk failure or even system destruction, typically, a priority is to rebuild a working system as soon as possible. This requires the computer hardware to be restored to the same state as it was before the disaster, which can take hours or even days, even before the file system can be restored. Generally, a significant amount of human intervention is required to complete this process.

In order to reduce the time and human intervention overhead of restoring a computer system after a disaster a back-up application software provides a so-called disaster recovery (DR) solution, which enables a computer system to be restored in an expedited manner to a state which existed before a disaster occurred. Such a scheme typically involves at least installing and configuring a minimal operating system, tape drivers and the back-up application software (or the requisite parts thereof) itself.

Known DR solutions typically required a user to generate a set of DR floppy disks. The DR floppy disks could be used to boot the computer system, when it is not possible to boot from the hard disk drive, and execute application software for recovering a backed-up copy of the file system from tape media. The DR floppy disks typically load and execute a minimal version of the operating system along with components of application software comprising DR functionality, thus providing sufficient functionality, for example, for the computer to build new disk partitions, access a tape drive and restore the data from tape media.

The DR operating system is required to reflect the exact hardware configuration of the computer system on which it is to be installed, otherwise it would not be possible to communicate with storage devices such as tape drives.

Typically, therefore, DR floppy disks need to be regenerated by a user whenever the system hardware configuration changes, and particularly when a SCSI (Small Computer Systems Interface) configuration changes. For example, if a new SCSI Host Bus Adaptor (HBA) is added to a server, with a respective new device driver, this device driver needs to be added to the DR floppy disks so that the new SCSI HBA is recognized when rebuilding the computer system.

A reason why DR floppy disks are/were used is that a floppy disk drive is one of the standard 'initial program load devices' (IPLD), which practically every PC is configured to 'boot' from. Herein, 'standard' as applied to an IPLD, implies that the PC is physically programmed to recognise the device for the purposes of booting. Currently, other standard IPLDs, sometimes known as BAIDS (BIOS Aware Initial Program Load Devices), include the first hard disk drive in a PC and, more recently, the first CD-ROM drive in a PC. Generally, however, an IPLD can be virtually any device that has the ability to load and execute a PC operating system.

It is known to boot from a CD-ROM drive, as long as the CD-ROM complies with the ISO 9660 CD-ROM standard, as extended by the 'El Torito' Bootable CD-ROM Format Specification, Version 1.0, Jan. 25, 1995, which is created jointly by IBM Corporation and Phoenix Technologies Ltd and which is entirely incorporated by reference herein. Booting from CD-ROM in a similar manner is also considered in detail in U.S. Pat. No. 5,727,213 which is entirely incorporated by reference herein. As described, to boot from CD-ROM, a PC's BIOS (basic input/output system) needs to specifically support reading boot record data from a CD-ROM, typically, as well as from a floppy disk or hard disk. U.S. Pat. No. 5,727,213 also proposes that tape media may also serve as a boot source, subject to the PC BIOS being modified to detect and read boot record data from a tape media. To date, however, PC BIOS standards do not support booting from tape media.

In a system which is bootable from a CD-ROM, U.S. Pat. No. 5,727,213 specifies that, to read boot record data from a CD-ROM, read commands directed to the floppy disk drive need to be re-directed to the CD-ROM drive during a read data part of the boot process. In addition, a modified SCSI driver of the PC needs to convert the 512 byte sectors conventionally used by hard disk and floppy disk into 2 Kbytes sectors conventionally used by a CD-ROM drive.

In view of the possibility of booting from CD-ROM, it would obviously also be possible to generate one or more DR CD-ROMs to replace the DR floppy disks. However, there would be little advantage in adopting this approach, and a significant cost increase. In particular, it would still be onerous for the user to have to generate, maintain and keep safe the DR CD-ROMs.

U.S. Pat. No. 6,701,450, which is entirely incorporated herein by reference, discloses a tape drive configured to operate as a bootable device for a PC. The tape drive has a first mode in which it operates as a normal tape drive, and a second mode in which it emulates a bootable CD-ROM drive. Bootable data is stored on tape media for access by the tape drive in emulation mode. U.S. patent application number 2002-0163760-A1, which is entirely incorporated herein by reference, shows a somewhat similar type of tape drive.

FIG. 1 shows a block diagram of such a prior art tape drive being coupled to a PC. The PC 100 is either a MS-DOS based machine, or a Windows NT or Windows 95/98 machine.

The tape drive 140 is, for example, a well-known DDS (Digital Data Storage) tape drive, DLT (Digital Linear Tape) tape drive or other device for transferring data to tape.

As shown in FIG. 1, the PC 100 includes a CPU 105 (Central Processing Unit), which is in communication, via a bus 110, with ROM 115 (Read Only Memory), RAM 120 (Random Access Memory) and an I/O (Input/Output) subsystem 125.

The I/O subsystem 125 connects the PC 100 to a number of storage devices, namely, a floppy disk drive 135 and, via a SCSI HBA 128, a hard disk drive 130 and the tape drive 140. The hard disk drive 130 and floppy disk drive 135 are represented as internal devices of the PC 100, whereas the tape drive 140 is represented as an external device, in this arrangement, although it could alternatively be an internal device.

In practice, the bus 110 may comprise multiple busses and respective bus subsystems; for example, host bus, PCI bus, EISA bus, or another bus type or switched interconnect.

As also shown in FIG. 1, a typical tape drive 140 includes a host interface 145 coupled to port 146 for controlling transfer of data between the tape drive 140 and the PC 100. Control signals received from the PC 100 are passed to a controller 150, which controls the operation of all components of the tape drive 140. The controller 150 typically consists of a microprocessor, for example a Motorola 68000 series microprocessor, a micro-controller (as illustrated in the present embodiment) controlled by firmware stored in ROM 185, or an ASIC (Application Specific Integrated Circuit).

For a data back-up operation, in response to receipt by the host interface 145 of data write signals from the PC, the controller 150 controls the tape drive 140 to write data to tape, comprising the steps: the host interface 145 receiving data from the PC 100 and passing it to the formatter 155; the formatter formatting the data, for example by compressing the data and adding error correction and detection codes, and storing the formatted data in a buffer 160, comprising, for example, a bank of 8 Mbytes of RAM; when appropriate (for example, when the buffer is nearly full), a read/write block reading the formatted data from the buffer 160 and converting the data into electrical signals suitable for driving magnetic read/write heads 170, which write the data to tape media of tape cartridge 175 in known fashion.

The tape cartridge 175 is mounted in a tape mechanism 180, which loads and ejects the tape cartridge 175 and winds the tape media forwards or backwards as required for reading and writing data. In a DDS tape drive, the read/write heads 170 are mounted on a helical scanning drum, which rotates to sweep the heads past the tape in a motion oblique to the direction of travel of the tape.

For a data restore operation, in response to read signals received by the host interface 145 from the PC 100, the controller 150 controls the tape drive to return the data to the PC 100, comprising the steps: the heads 170 reading data signals from the tape media; the read/write block 165 converting the signals into digital data representation and storing the data in the buffer 160; the formatter 155 reading the data from the buffer 160, processing the data to remove errors and decompressing the data to be passed on to the host interface 145; and the host interface returned the data to the PC 100.

The host interface 145, formatter 155 and read/write blocks typically each comprise one or more appropriately programmed ASICs.

PC 100 communicates with the tape drive 140 using one of the well-known standard SCSI protocols, such as SCSI2. Accordingly, the host interface 145 comprises an appropriate SCSI adaptor. Alternatively, other protocols such as EIDE or Fibre Channel, could be used. The tape drive 140 has firmware 185, which controls the operation of the tape drive.

The firmware 185 may be modified by writing a new set of instructions to the existing ROM (if the ROM is an EEPROM) using a standard firmware update process, which is well known and will, thus, not be described herein. Alternatively, the ROM may simply be replaced with one containing the new instructions. In this way, it is a relatively simple process to modify the behaviour of a standard tape drive 140.

Firmware 185 provides both a 'Normal Mode' of operation, in which the tape drive 140 behaves as a tape drive 140, and a 'DR Mode' of operation, in which the tape drive 140 is arranged to emulate a CD-ROM drive. The CD-ROM drive emulation is achieved in part by configuring the tape drive 140 to identify itself to the PC 100 as a CD-ROM drive and also by modifying a SCSI command set in the tape drive 140 to emulate the SCSI command set of a CD-ROM drive. With the ability to emulate a CD-ROM drive, the tape drive 140 can act as an IPLD, without the need to modify existing PC BIOS standards, PC hardware or PC operating systems.

Whether the tape drive 140 operates in Normal Mode or DR Mode is determined by user selection. The user selection of mode may be performed without the need for any additional tape drive hardware, by using the tape drive Eject button; if the tape drive 140 is powered on the Eject button held down, the DR Mode of operation is selected, otherwise the Normal Mode is selected. Alternatively the tape drive may have an extra selection button for activation of the DR Mode. As a further alternative an external mode choice command is entered into the tape drive, e.g. a SCSI mode select command.

This selection function is achieved by the tape drive's firmware 185 which checks the status of the Eject button during a power-on self-tests sequence. Alternatively, DR Mode can be selected by holding the Eject button down for a long time period (such as five seconds), when the tape drive 140 is already powered on, by the firmware 185 which checks the length of the period the Eject button is held down to determine whether the operation is an eject or the user selecting DR Mode. Various other means for selecting mode could be employed, for example by providing a specific DR button or switch on the tape drive 140.

FIG. 2 illustrates the steps involved in setting the tape drive of FIG. 1 into 'DR Mode' and booting the PC from the tape drive.

In step 500, a user initiates DR Mode in the tape drive 140 by holding down the Eject button when the power is switched on. As a result, the tape drive 140 displays an appropriate signal on the front panel (not shown) of the tape drive; for example, by setting one or more front panel LEDs to flash or generating a graphical message on an LCD display. The tape drive 140 then continues as follows.

In step 505, the tape drive 140 determines whether tape cartridge 175 is present in the tape drive 140 in normal fashion, and generates an appropriate warning signal to the user if not, in step 510. While waiting for the media to be loaded and while checking the media for DR capability, the tape drive 140 is arranged to respond to a Test Unit Ready command from the PC 100 by returning 'CHECK CONDITION', with sense key 'NOT READY' (0x02) and extended sense 'LOADING' (0x0401). This in fact may be a false response, which is intended to trick the BIOS into waiting for the tape to load (if it has not done so already), which can take up to thirty seconds after being inserted into the tape drive after power-on.

In this case, if a true response were returned before a tape had been loaded (a true response including extended sense 'MEDIA NOT LOADED'), the BIOS would move straight on from the tape drive in an attempt to find a different IPLD. In other words, DR would not work. The false response causes the BIOS to wait at least 60 seconds before timing out after waiting for the tape drive (which is emulating a CD-ROM drive) to read the first block. This time is sufficient for the tape cartridge to be inserted, loaded and checked for DR capability. The ability to generate a false response is a key requirement of tape drive operation when the tape drive 140 is an 'internal' tape drive, which shares the power of the PC. In the absence of this feature, it is highly likely that than 'internal' tape drive would not be able to provide the DR Mode. Obviously, the feature is not such an issue with an 'external' tape drive, which has its own power supply and can be switched on and prepared in advance of switching the PC on.

If, or once, tape cartridge 175 is loaded by the user, in step 515, the firmware 185 controls the tape drive 140 to check to see if the tape cartridge 175 is a valid DR tape cartridge. This is achieved by rewinding the tape media, reading from the beginning of the tape media and searching for an appropriate Boot System Identifier entry in a Boot Record Volume Description of a CD-ROM image.

If the tape cartridge 175 is found to be a DR cartridge then, in step 525, the tape drive 140 switches to DR Mode by enabling the appropriate CD-ROM SCSI command set and displaying an appropriate DR Mode signal on the front panel. Otherwise, in step 520, the tape drive 140 ejects the tape cartridge 175 and another appropriate warning signal is provided via the front panel display, in step 510.

The tape drive 140 remains in 'DR Mode' until one of the following conditions are met: tape drive 140 is power cycled; back-up application software sends a DR Mode page command to disable DR Mode; user manually ejects the loaded DR capable media; or, the tape drive 140 receives a SCSI bus rest after 100 CD-ROM blocks or more have been read while in DR Mode.

When exiting 'DR Mode', the emulated CD-ROM SCSI commands are disabled and the tape drive 140 reverts to Normal Mode; the tape drive 140 then appears to be in the same state as it had just been powered on.

In step 530, the PC 100 is booted and carried out the steps defined by the BIOS program, as described above. In particular, in step 535, the PC 100 searches for an IPLD, which contains a bootable file system. The typical BIOS boot sequence is:
1. search for a floppy disk drive containing a bootable floppy disk—if found, then attempt to boot from this, otherwise
2. search for a CD-ROM drive containing bootable CD-ROM media—if found, then attempt to boot from this, otherwise
3. if no bootable floppy disk or CD-ROM drive is found, then attempt to boot from hard disk drive.

Assuming no other IPLDs containing bootable data are found, the PC 100 accesses the tape drive 140, in step 540, and issues a SCSI 'INQUIRY'. In response, in step 545, the tape drive 140, operating in DR Mode, returns a Standard Inquiry Data CDB (Control Data Block) having a Peripheral Device Type value of 5 (CD-ROM device type) rather than 1 (tape drive device type), which identifies the tape drive 140 as a CD-ROM drive. Then, in step 550, the PC 100 reads the beginning of the CD-ROM image from the tape drive 140 to check for bootable CD-ROM file system, and, when returned by the tape drive 140 in step 555, the PC 100 designates the tape drive 140 as the boot path in step 560. This means that the PC 100 will boot from the CD-ROM image in the tape drive 140 path, even if there are other, real CD-ROM drive devices present in the system (as long as they do not contain a bootable CD-ROM). The only other requirement for the DR operation to function is that the PC BIOS, or SCSI host adaptor BIOS, supports bootable CD-ROM drives (which is typically the case in all modern SCSI host adaptor cards or motherboard chipsets).

In step 565, the PC 100 reads the CD-ROM image, which is returned by the tape drive 140 in step 570. The operating system files are read directly into RAM 120 and are executed by the CPU 105 in order to configure the PC, including to be able to access a tape drive 140. The back-up application software files are read and stored on the hard disk, form where they can be executed.

Next, in step 575, the PC 100 executes the back-up application software for DR and issues a SCSI Mode Select command that accesses the DR Mode page of the tape drive to terminate DR Mode and begin Normal Mode, to continue with normal tape drive operation.

In step 580, the tape drive 140 reverts to Normal Mode, the buffer 160 is purged and the tape media is allowed to be physically accessed by standard tape drive commands (i.e. Locate, Space, Read, etc). This allows the PC's recovery to proceed as if it had initially booted from DR floppy disk.

Finally, in step 585, the PC 100 continues to retrieve from the tape drive 140 the backed-up data set stored on tape cartridge 175 until the whole PC 100 file system is restored to hard disk drive 130. Thereafter, the re-built PC 100 can boot from the hard disk drive 130 as normal.

US patent application number 2005-0120166-A1 (now U.S. Pat. No. 7,415,570), which is incorporated herein by reference, discloses a tape drive having a first port for communicating with the tape drive in tape drive mode, and a second port for communicating with the tape drive in an optical storage device mode, for example CD-ROM mode, the second port enabling an external device to access the emulation apparatus. Thus, for disaster recovery purposes, it is not necessary to switch the tape drive into disaster recovery mode. Again, bootable data is stored on tape media for access by the tape drive.

SUMMARY

In one aspect of the invention, a tape drive for exchanging data with a tape cartridge, the tape cartridge having tape media and auxiliary memory that is not tape media, is operable, in response to a boot request from a computer apparatus that is bootable from a kind of initial program load device that is not a tape drive, to read boot data stored on the auxiliary memory and to output said boot data for booting said computer apparatus.

In another aspect of the invention, a tape drive for exchanging data with a tape cartridge, the tape cartridge having tape media and auxiliary memory that is not tape media, is operable, in response to a request to create a boot image record, to receive boot data for booting a computer apparatus that is bootable from a kind of initial program load device that is not a tape drive, and write said boot data to the auxiliary memory.

In a further aspect of the invention, a method of creating a disaster recovery record on a tape cartridge comprising a tape media and non-volatile read-write direct access auxiliary memory, comprises, in any convenient sequence: (i) writing bootable initial program load device image data to the auxiliary memory; and (ii) writing user data to the tape media.

In a further aspect of the invention, a method of creating a disaster recovery record on a tape cartridge comprising a tape media and non-volatile read-write direct access auxiliary memory, and/or of causing data recovery using the tape cartridge, comprises: (i) in response to a request to create a disaster recovery record: (a) causing a tape drive to write bootable initial program load device image data to the auxiliary memory; and (b) causing the tape drive to write user data to the tape media; and/or (ii) in response to a request to recover data: (a) causing a tape drive to read bootable initial program load device image data from the auxiliary memory and output the data for receipt by the computer apparatus, for booting the computer apparatus; and (b) causing the tape drive to read user data from the tape media and output the user data for receipt by the computer apparatus.

In a further aspect of the invention, there is provided a tape cartridge comprising an auxiliary memory having bootable data stored thereon.

BRIEF DESCRIPTION OF THE DRAWINGS

In the following a preferred embodiment of the invention will be described, by way of example only, and with reference to the drawings in which.

DETAILED DESCRIPTION

Figure 1:
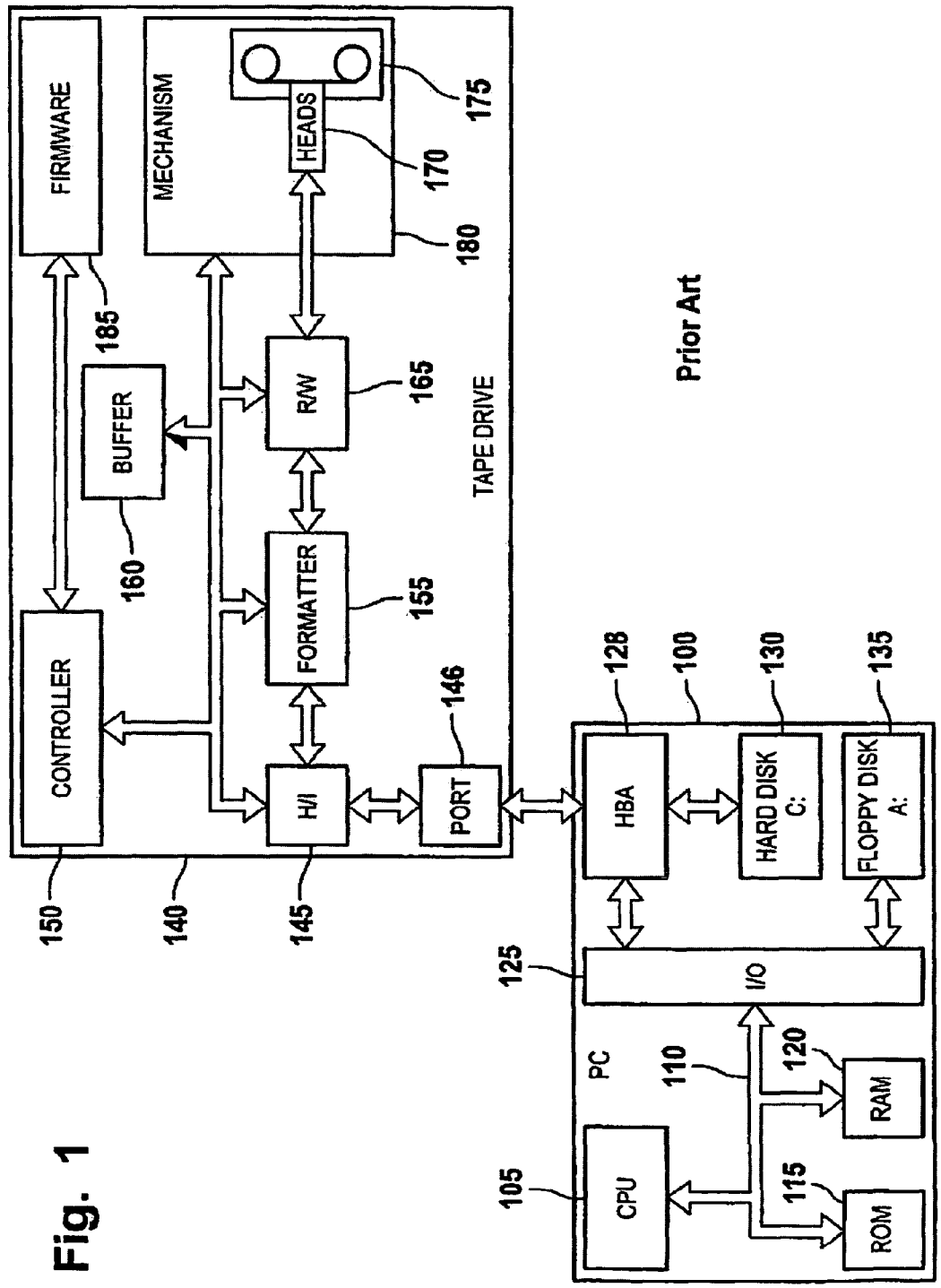
FIG. 1 is a schematic block diagram showing a prior art computer and tape drive.
Figure 3:
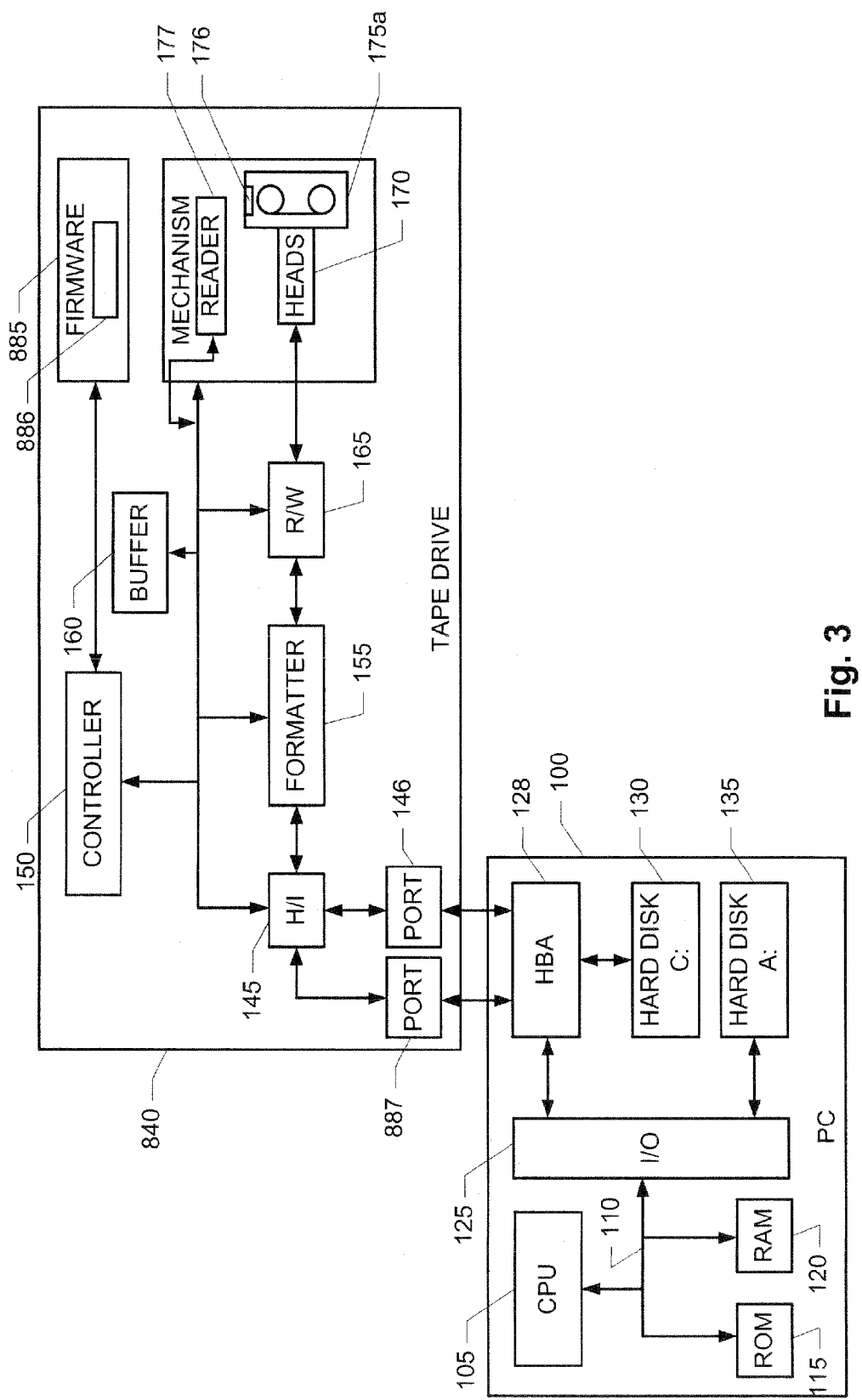
FIG. 3 is a schematic block diagram showing a computer and an embodiment of a tape drive according to the invention.

FIG. 3 shows a tape drive 840. The tape drive 840 has a host interface 145 which is coupled to a port 146, a controller 150, a formatter 155, a buffer 160, a read/write block 165, read/write heads 170 of a tape mechanism 180 in which a tape cartridge can be inserted. These elements of tape drive 840 have substantially the same design as the respective elements described above with reference to FIG. 1.

Tape drive 840 has firmware 885 that includes program instructions for causing the tape drive 840 to persistently identify itself and behave as a tape drive when accessed at port 146 and to persistently identify itself and behave as a CD-ROM drive when accessed at port 887. The assignment of the CD-ROM emulation and tape drive behaviour to the ports 887 and 146 may be user selectable. When behaving as a tape drive, the tape drive 840 accesses tape media and behaves according to a tape drive format, for example one of the Linear Tape Open (LTO), Digital Data Storage (DDS), or Digital Linear Tape (DLT) formats.

Ports 146 and 887 can be provided as respective physical connections having respective SCSI logical units (LUNs) allocated thereto, or alternatively as respective LUNs that are accessed through a single physical connection. The unqualified term "port" in its broadest sense as used herein means a logical unit, a physical port, or a combination thereof.

Tape drive 840 includes an RFID auxiliary memory reader 177 for reading and writing data to a non-volatile auxiliary memory 176 associated with an inserted tape cartridge 175a. The auxiliary memory 176 has sufficient data storage capacity to contain a desired boot image, for example a CD-ROM boot image according to the El Torito format specification mentioned above, requiring memory capacity in the order of tens of MBytes. The auxiliary memory 176 comprises a plurality of RFID memory tags. Such tags have thin and small physical dimensions, each tag having for example a largest areal dimension of the order of about 1-2 mm$^2$ and data storage capacity of the order of about 1 MByte. For example, the tags can have a thin square shape, the sides of the square each being about 1 mm in length. The tags are wirelessly powered by the reader 177. Suitable tag technology is described for example in U.S. Pat. No. 6,942,158 and U.S. patent application No. 2004-0100382A, both of which are entirely incorporated herein by reference. Clearly, the number of memory tags employed can be varied according to the desired size of the CD-ROM boot image and the storage capacity of each tag, which is likely to increase with advances in technology.

Auxiliary memory 176 can be located at any conveniently accessible location on a cartridge 175a, inside or outside the cartridge casing, and is conveniently fixedly attached to the cartridge 175a. An appropriate technology for the reader 177 to access the memory tags is described in the aforementioned patent documents. Whilst RFID communication between reader 177 and memory 176 has been described, alternative devices using any alternative form of communication could be envisaged, for example any other convenient form of wireless communication, or some form of contact communication.

Figure 6:
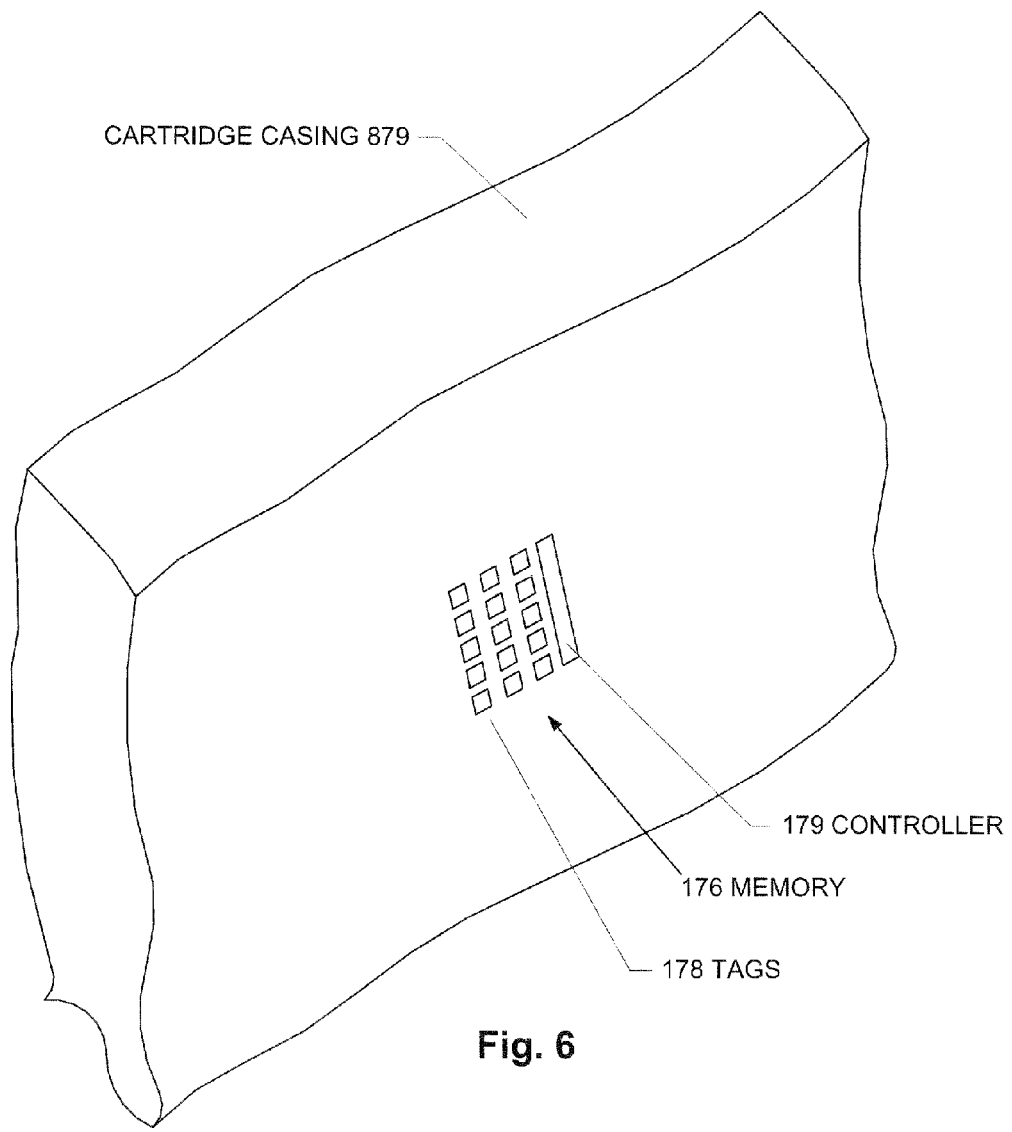
FIG. 6 shows a portion of a tape cartridge casing and memory attached to the casing.

As shown in FIG. 6, tags can be arranged on a casing 879 of the cartridge 175a in an aggregation scheme controlled by a suitable memory controller 179 powered wirelessly by the reader 177. Alternatively, the drive comprises a controller (not shown) for controlling the plurality of memory tags as though it were a contiguous memory. Conveniently, the firmware 885 of the drive 840 provides instructions enabling the drive to act as a controller.

In an alternative embodiment, known RFID memory and reader technology as currently used for storing modest amounts of metadata in accordance with some current tape drive formats, for example LTO, is employed for providing the reader 177 and auxiliary memory 176, as long as memory of sufficiently increased capacity can be obtained.

Figure 4:
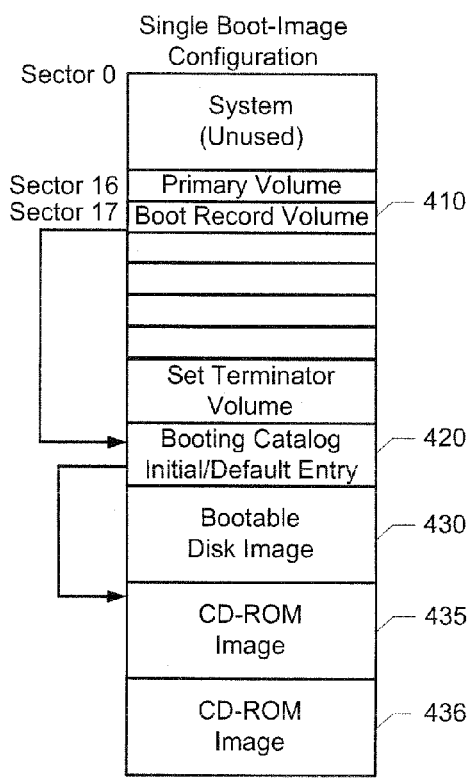
FIG. 4 illustrates a single boot-image configuration in accordance with the El Torito bootable CD-ROM format specification.
Figure 5:
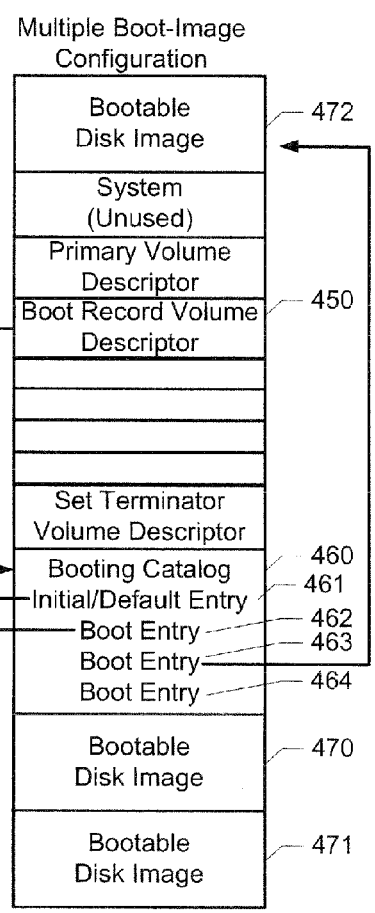
FIG. 5 illustrates a multiple boot-image configuration in accordance with the El Torito bootable CD-ROM format specification.

Boot data is stored on the auxiliary memory 176 of cartridges 175a according to an agreed tape drive operating format and in compliance with the El Torito specification mentioned above. Specifically, for use with PCs with single boot image capability the configuration in FIG. 4 is used, where the boot sector 410 or (boot record volume) provides access to a booting catalogue 420, for verification of the existence of a boot image 430 on the emulated CD-ROM, consequent reading of the initial default entry 420, and booting from the disk image 430 specified in this entry 420. For PCs with multiple boot image capability the configuration in FIG. 5 is used, where the boot record volume 450 provides access to a booting catalogue 460, for verification of the existence of a boot image on the emulated CD-ROM, consequent selection of the initial default entry 461 or another of one or more boot image entries 462, 463, 464 listed in the booting catalogue 460, and booting from the selected disk image. In the embodiment, the bootable disk image is a floppy disk image, that is, data that emulates a 1.2M, 1.4M or 2.88M floppy drive boot sequence. However, alternatives such as hard drive images and raw instructions (no emulation) are also defined in El Torito.

PC, or host, 100 has a storage interface controller. In the embodiment considered here the storage interface controller is a SCSI host bus adapter (HBA) 128 that is coupled to both ports 146 and 887 of tape drive 840. Any suitable alternative controller could be employed, for example an iSCSI or SAS HBA. It should be noted that the rest of the internal arrangement is not important, and that any computer that follows standard boot procedures can be employed. In particular, the internal components of the PC 100 or other computer can be interconnected by any convenient form or combination of switched or shared interconnects.

Figure 2:
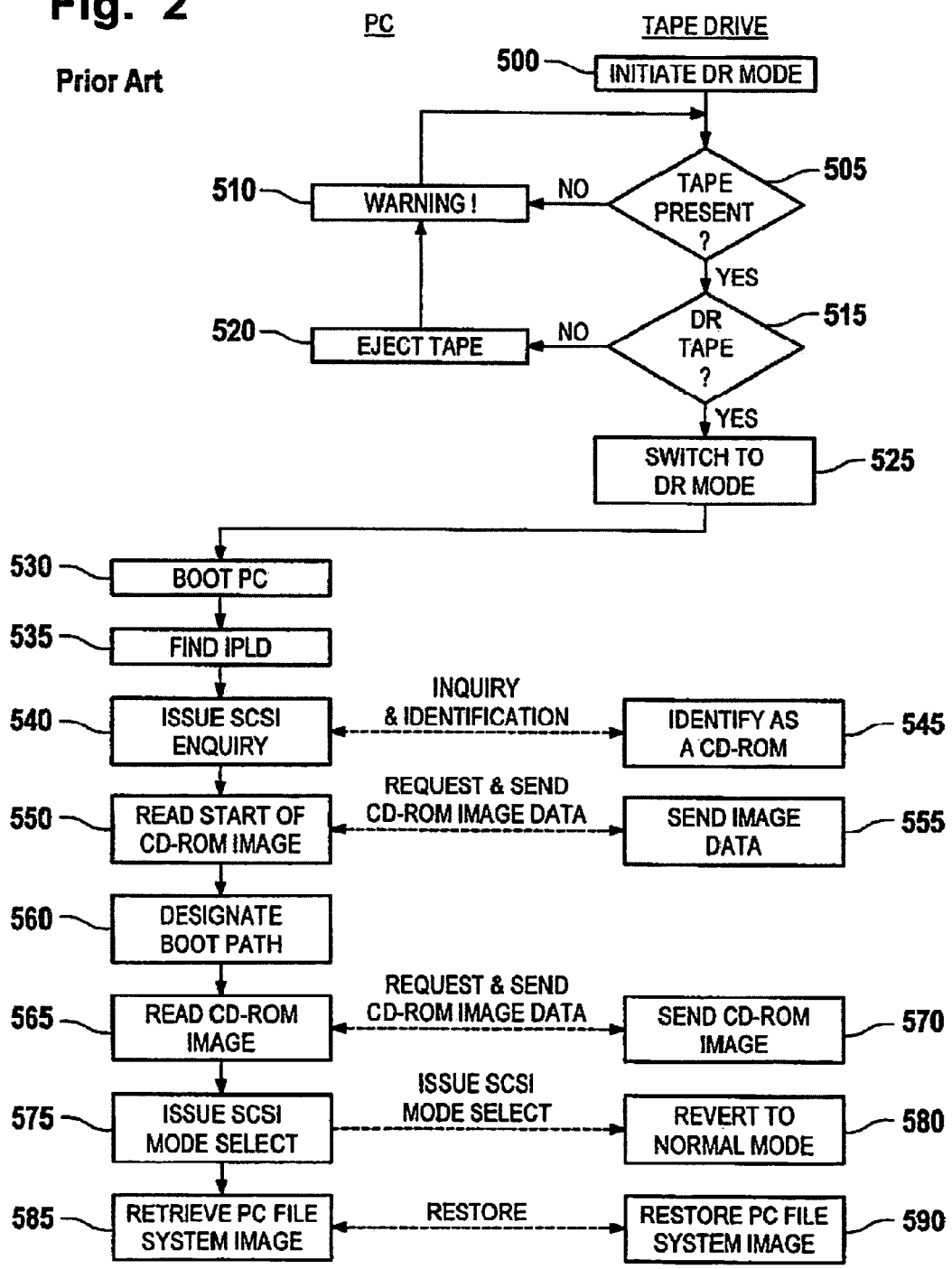
FIG. 2 is a flow diagram illustrating prior art steps involved in setting the tape drive of FIG. 1 into 'DR Mode' and booting a computer from the tape drive.
Figure 7:
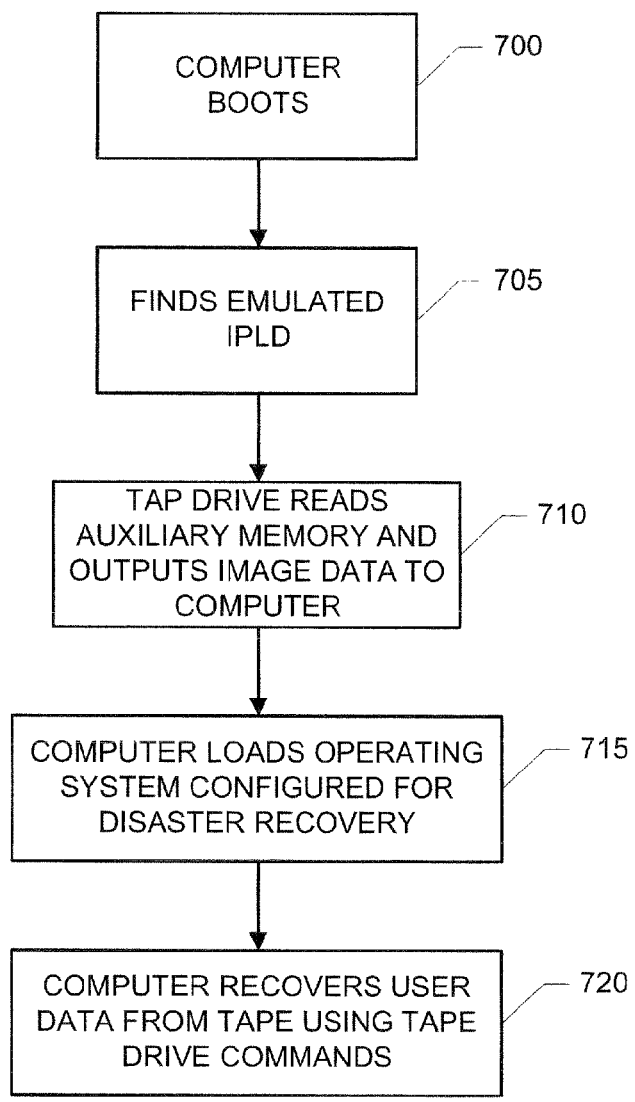
FIG. 7 is a flow diagram illustrating a method of booting a computer.

Referring now to FIG. 7, when PC 100 boots (step 700), if there is no bootable data stored on hard disk drive 130, as part of its boot sequence PC 100 finds the emulated IPLD on port 887 (step 705), in the embodiment the CD-ROM drive. Note that no mode switching is necessary. The PC 100 and tape drive 840 then perform steps analogous to steps 540 through 570 described with reference to FIG. 2, using port 887 for communication. Specifically, the PC 100 issues a SCSI enquiry using port 887 and the tape drive 840 identifies itself as a CD-ROM. The tape drive 840 accesses the boot sector 410 or 450 of the boot data stored on the auxiliary memory 176 of the inserted tape cartridge 175*a* using the reader 177. The PC 100 thus accesses the booting catalogue to confirm that the IPLD is a bootable device. The PC 100 requests CD-ROM boot image data 430, 470 or 471 using port 887, and in response to the request the firmware 885 controls the tape drive 840 to read the requested boot image data 430, 470 or 471 stored on the auxiliary memory 176 and output the boot image data to PC 100 through port 887 in CD-ROM format (step 710), using the usual CD-ROM data block size, for example a 2 KByte block size. Thus, an operating system configured for disaster recovery is loaded into the PC's hard disk and/or RAM (step 715). Once the operating system is loaded, the PC 100 uses port 146 to retrieve backed-up user data from tape media of the tape cartridge 175*a* (step 720), for this step communicating with the tape drive 840 using familiar tape drive format commands and using a data block size appropriate to the format, for example a 64 KByte block size. Firmware 885 has corresponding instructions 886 for implementing the functionality described in this paragraph.

The instructions 886 also enable the tape drive to respond to a request from the PC 100 to create a boot record with single or multiple bootable disk images, as described above in accordance with El Torito, by receiving boot data from the PC 100 and writing the boot data to the auxiliary memory 175*a*. If a boot image 430, 470, 471, 472 needs updating subsequent to the writing of user data to tape, the image 430, 470, 471, 472 can be conveniently replaced. This facility can be used, for example, to adjust the image for a different PC configuration such as when new drivers are loaded onto the PC 100, or to provide a disk image of a different type of initial program load device to the first bootable image data (for example to provide a hard disk image instead of a floppy disk image). Where multiple disk images are possible, an updated or alternative disk image 470, 471, 472 can be added.

This is advantageous in that amending of bootable disk images stored on tape, as in the prior art, is generally not viable as current tape storage formats do not allow mid-tape changes to data. Furthermore, because of the directly accessible nature of the auxiliary memory 176, restore during data recovery can be quicker and easier because it avoids inconvenient multiple repositioning of the tape normally needed during disaster recovery to access different parts of a boot image stored on tape.

It will be apparent that the PC 100 can exchange data over the port 887 using data blocks generally used for communicating with CD-ROM drives, for example blocks of relatively small size such as 2 KByte data blocks, and can exchange user data for back-up and recovery purposes over another port 146 using data blocks generally used for communicating with tape drives, for example blocks of greater size such as 64 KByte data blocks. To this end, the firmware instructions 886 can allow an optical device LUN on port 887 to be configured to have a different block size setting to a tape drive LUN on port 146. This facilitates alleviation of a problem encountered with prior art that stores the CD-ROM image on tape, whereby also the user data must be transferred between tape drive and tape media using the lower size data blocks required for the CD-ROM image data. Such a problem can occur, for example, when using back-up application software that does not allow a change of block size during tape operation, or when using standards such Microsoft Tape Format that can force an application to use one relatively small block size for the duration of a tape.

As an alternative to the SCSI connectivity to the PC 100 shown in FIG. 3, the ports 146 and 887 could be arranged and configured for connection to other entities using different protocols, for example to the switching fabric of a storage area network (SAN, not shown) using the FibreChannel protocol or any other convenient and appropriate protocol. The SAN could be configured such that the port 887 emulating a CD-ROM drive is available to one set of host computers to boot from it, while the "standard" tape drive port 146 is available to other host computers to maintain data path security and ensure appropriate device configuration on those hosts that utilise it as a tape device.

The tape drive 840 of FIG. 3 does not require any manual intervention of the user to bring it into a disaster recovery mode. Rather, both the tape drive 840 and the emulated CD-ROM drive can persistently appear as separate LUNs at ports 146 and 887, respectively, obviating a need to manually activate a button in order to bring the tape drive into the disaster recovery mode. Nevertheless, in an alternative embodiment, the CD-ROM drive is not persistently emulated, but the tape drive has one port and is switched between CD-ROM (or other IPLD) emulation mode and tape drive mode as required, the bootable data being accessed from auxiliary memory when the tape drive is in CD-ROM emulation mode.

In the present specification "comprises" means "includes or consists of" and "comprising" means "including or consisting of". The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A tape drive for exchanging data with a tape cartridge, the tape cartridge having tape media and auxiliary memory that is not tape media, the tape drive being operable, in response to a boot request from a computer apparatus that is bootable from a kind of initial program load device that is not a tape drive, to read boot data stored on the auxiliary memory and to output said boot data for booting said computer apparatus, wherein the tape drive is adapted to persistently identify itself as a CD-ROM or DVD device in addition to persistently identifying itself as the tape drive, and wherein the tape drive is adapted to persistently identify itself on a first port as said kind of initial program load device in addition to persistently identifying itself on another port as the tape drive.

2. The tape drive according to claim 1, further operable to output said boot data to the computer apparatus in a format appropriate to the said kind of initial program load device, said boot data comprising data blocks of a first size, and output user data read from the tape media of the tape cartridge, the user data comprising data blocks of a second size, the second size being greater than the first size.

3. The tape drive according to claim 1, adapted to persistently identify itself as said kind of initial program load device using a first LUN in addition to persistently identifying itself as the tape drive using a second LUN.

4. The tape drive according to claim 1, further comprising a reader operable to exchange data with the auxiliary memory, the auxiliary memory comprising a plurality of memory tags, and a controller for controlling the data exchanged between the reader and each of the memory tags as though the plurality of memory tags were a contiguous memory.

5. The tape drive according to claim 1, operable, in response to a request to create a boot image record, to receive the boot data for booting said computer apparatus, and write said boot data to the auxiliary memory of said tape cartridge.

6. A method of a tape drive, comprising:
 receiving a boot request from a computer apparatus that is bootable from a kind of initial program load device that is not the tape drive;
 in response to the boot request, reading boot data stored on auxiliary memory of a tape cartridge that also includes tape media, wherein the auxiliary memory is a type of media different from the tape media;
 outputting the boot data read from the auxiliary memory to the computer apparatus to boot the computer apparatus; and
 the tape drive persistently identifying itself as a CD-ROM or DVD device in addition to persistently identifying itself as the tape drive, wherein the tape drive persistently identifies itself on a first port as the kind of initial program load device in addition to persistently identifying itself on another port as the tape drive.

7. A non-transitory computer-readable medium containing therein data back up and recovery software, which, when executed by a computer, causes the computer to perform the method of claim 6.

8. The tape drive of claim 1, further comprising:
 the first port through which the tape drive is accessible as the kind of initial program load device that is not the tape drive; and
 the second, different port through which the tape drive is accessible as the tape drive.

9. The method of claim 6, further comprising subsequently writing to the auxiliary memory bootable initial program load device image data pertaining to a different host configuration and/or different type of emulated initial program load device.

* * * * *